United States Patent
Lauster

(10) Patent No.: US 11,259,241 B2
(45) Date of Patent: Feb. 22, 2022

(54) RADIO ACCESS NETWORK SLICE

(71) Applicant: Deutsche Telekom AG, Bonn (DE)

(72) Inventor: Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/955,169

(22) PCT Filed: Oct. 24, 2018

(86) PCT No.: PCT/EP2018/079187
§ 371 (c)(1),
(2) Date: Jun. 18, 2020

(87) PCT Pub. No.: WO2019/120695
PCT Pub. Date: Jun. 27, 2019

(65) Prior Publication Data
US 2020/0383042 A1    Dec. 3, 2020

(30) Foreign Application Priority Data
Dec. 22, 2017   (EP) .................................... 17210124

(51) Int. Cl.
*H04W 48/18*   (2009.01)
*H04W 8/08*    (2009.01)
(Continued)

(52) U.S. Cl.
CPC ............. *H04W 48/18* (2013.01); *H04W 8/08* (2013.01); *H04W 48/08* (2013.01); *H04W 48/17* (2013.01);
(Continued)

(58) Field of Classification Search
CPC ..... H04W 48/02; H04W 48/08; H04W 48/14; H04W 76/10; H04W 76/11; H04W 76/18
See application file for complete search history.

(56) References Cited

U.S. PATENT DOCUMENTS

2017/0142591 A1* 5/2017 Vrzic .................... H04W 76/11
2017/0331785 A1* 11/2017 Xu ........................ H04W 76/11
(Continued)

FOREIGN PATENT DOCUMENTS

WO   WO 2011130906 A1   10/2011
WO   WO 2017063708 A1   4/2017

OTHER PUBLICATIONS

Anonymous, "3rd Generation Partnership Project; Technical Specification Group Radio Access Network; Study on New Radio Access Technology; Radio Access Architecture and Interfaces (Release 14)," *3rd Generation Partnership Project (3GPP)* (Mar. 5, 2017). XP051233419.

*Primary Examiner* — Redentor Pasia
(74) *Attorney, Agent, or Firm* — Leydig, Voit & Mayer, Ltd.

(57) ABSTRACT

A radio access network (RAN) slice provides radio access to a communication network for a user equipment. The RAN slice is uniquely identified by a RAN slice identifier. The RAN slice includes: a base station for providing access to the RAN slice for the user equipment; an access and mobility management function (AMF) entity configured to handle the RAN slice identifier identifying the RAN slice; and a session management function (SMF) entity configured to handle data communications of the user equipment over the RAN slice. The base station is configured to receive an attach request originating from the user equipment to connect to the RAN slice, and to reject access to the RAN slice in response to the attach request not comprising the RAN slice identifier.

14 Claims, 4 Drawing Sheets

(51) Int. Cl.
  *H04W 48/08*  (2009.01)
  *H04W 48/00*  (2009.01)
  *H04W 76/10*  (2018.01)
  *H04W 76/11*  (2018.01)
  *H04W 76/18*  (2018.01)

(52) U.S. Cl.
  CPC ............ *H04W 76/10* (2018.02); *H04W 76/11* (2018.02); *H04W 76/18* (2018.02)

(56) References Cited

U.S. PATENT DOCUMENTS

| | | | |
|---|---|---|---|
| 2017/0339609 A1* | 11/2017 | Youn | H04W 76/11 |
| 2017/0339688 A1* | 11/2017 | Singh | H04W 76/11 |
| 2017/0367036 A1* | 12/2017 | Chen | H04L 43/08 |
| 2018/0035399 A1* | 2/2018 | Xu | H04W 8/06 |
| 2018/0206152 A1* | 7/2018 | Zhang | H04W 72/12 |
| 2018/0227873 A1* | 8/2018 | Vrzic | H04W 76/27 |
| 2019/0182875 A1* | 6/2019 | Talebi Fard | H04W 76/11 |
| 2020/0022033 A1* | 1/2020 | Wei | H04W 36/0055 |
| 2020/0045753 A1* | 2/2020 | Dao | H04W 4/08 |
| 2020/0120580 A1* | 4/2020 | Jin | H04W 48/02 |
| 2020/0187092 A1* | 6/2020 | Lindheimer | H04W 48/08 |
| 2021/0051753 A1* | 2/2021 | Ohlsson | H04W 76/11 |

* cited by examiner

RADIO ACCESS NETWORK SLICE

CROSS-REFERENCE TO PRIOR APPLICATIONS

This application is a U.S. National Phase Application under 35 U.S.C. § 371 of International Application No. PCT/EP2018/079187, filed on Oct. 24, 2018, and claims benefit to European Patent Application No. EP 17210124.8, filed on Dec. 22, 2017. The International Application was published in English on Jun. 27, 2019 as WO 2019/120695 A1 under PCT Article 21(2).

FIELD

The invention relates to a radio access network slice for providing radio access to a communication network for a user equipment and a communication method.

BACKGROUND

Access to a mobile communication networks for a user equipment, such as a mobile phone, is performed over a radio access network (RAN) comprising a base station, in particular a gNodeB of a 5G network, and functional entities, for example an access and mobility management function (AMF) entity and a session management function (SMF) entity. The RAN that receives the request to connect to the communications network is responsible for providing the communication connection to the user equipment.

Different RANs may comprise a different amount of communication resources based on an estimated resources requirement. Nevertheless, such an estimate may not always fit and some user equipments may have a compelling need to connect to a communication network connection, for example an emergency telephone.

SUMMARY

In an exemplary embodiment, the present invention provides a radio access network (RAN) slice for providing radio access to a communication network for a user equipment. The RAN slice is uniquely identified by a RAN slice identifier. The RAN slice includes: a base station for providing access to the RAN slice for the user equipment; an access and mobility management function (AMF) entity configured to handle the RAN slice identifier identifying the RAN slice; and a session management function (SMF) entity configured to handle data communications of the user equipment over the RAN slice. The base station is configured to receive an attach request originating from the user equipment to connect to the RAN slice, and to reject access to the RAN slice in response to the attach request not comprising the RAN slice identifier.

BRIEF DESCRIPTION OF THE FIGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

DETAILED DESCRIPTION OF THE FIGURES

Figure 1:
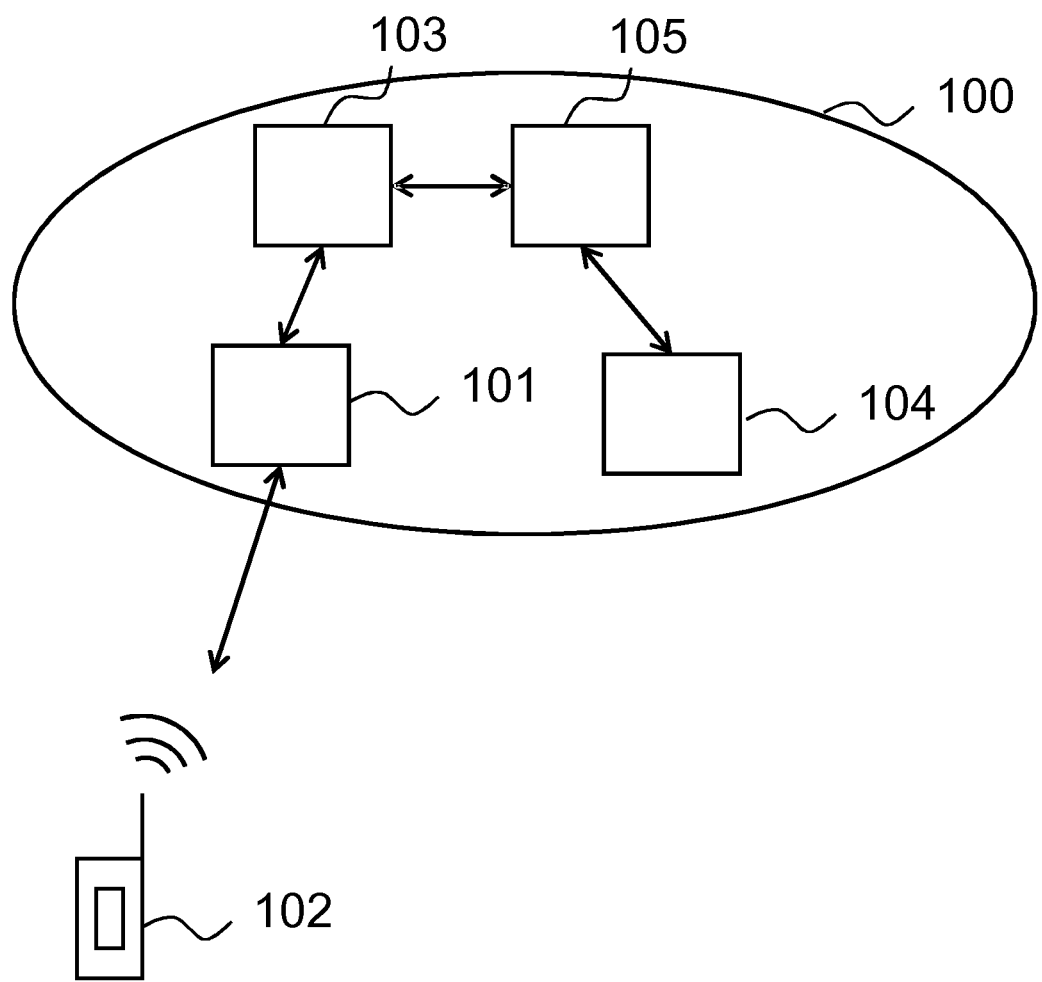
FIG. 1 shows a schematic diagram of an arrangement according to an embodiment of the invention.

Exemplary embodiments of the invention provide radio access to a communication network.

In an exemplary embodiment, the invention provides a radio access network (RAN) slice for providing radio access to a communication network for a user equipment. The RAN slice is uniquely identified by a RAN slice identifier. The RAN slice comprises a base station for providing access to the RAN slice for the user equipment, an access and mobility management function (AMF) entity, which is configured to handle the RAN slice identifier that is identifying the RAN slice, and a session management function (SMF) entity which is configured to handle data communications of the user equipment over the RAN slice. The base station is configured to receive an attach request originating from the user equipment to connect to the RAN slice, and to reject access to the RAN slice if the attach request does not comprise the RAN slice identifier.

The RAN slice may be a subnetwork of a communication network. The RAN slice comprises a base station, in particular a gNodeB, and an AMF and an SMF. The RAN slice may comprise further functional entities of a communication network, in particular a 5G network, like a user plane function (UPF).

The user equipment may be a computer system, in particular a mobile phone, a smartphone, a tablet computer, a laptop computer or others. The user equipment may also be an Internet of Things (IoT) device, in particular a sensor.

The RAN slice identifier may comprise a unique code that can be assigned to the RAN slice unambiguously. The RAN slice identifier identifies the RAN slice.

The AMF entity is configured to handle the RAN slice identifier. The AMF entity may further handle one or more functions, like termination of RAN control plane interface, mobility management, access authentication, access authorization and others.

The SMF entity is configured to handle data communications of the user equipment over the RAN slice. The SMF may further be configured to handle roaming functionality, session management, selection and control of a user plane function (UPF) entity or others alone or in combination.

The user equipment is configured to transmit an attach request signal towards the communication network, i.e. towards the base station, in order to request access to the communication network. The base station may hand the attach request over to the AMF entity. The RAN slice may be a RAN slice reserved for prioritized user equipment and therefore a prioritized RAN slice.

In an embodiment, base station is configured to grant access to the RAN slice for the user equipment if the attach request comprises the RAN slice identifier.

The user equipment may be registered as a prioritized user equipment and therefore may comprise the RAN slice identifier related to the RAN slice.

In an embodiment, the attach request comprises a transmitted slice identifier. The base station is configured to compare the transmitted slice identifier with the RAN slice identifier in order to determine whether the transmitted slice identifier corresponds the RAN slice identifier. The base station is configured to reject access to the RAN slice if the transmitted identifier differs from the RAN slice identifier.

The user equipment may have a slice identifier in order to select a predetermined RAN slice and transmits this slice identifier within the attach request. The slice identifier may have been handed over to the user equipment in order to grant the user equipment access to the prioritized RAN slice.

In an embodiment, the connection request comprises a transmitted slice identifier. The base station is configured to forward the transmitted slice identifier or the attach request towards the AMF entity. The AMF entity is configured to compare the transmitted slice identifier with the RAN slice identifier in order to determine whether the transmitted slice identifier corresponds to the RAN slice identifier. The AMF entity is configured to transmit a reject signal towards the base station if the transmitted identifier differs from the RAN slice identifier. The base station is configured to reject the requested access to the RAN slice by the user equipment in response to the reject signal.

The base station hands the decision for granting access to the RAN slice over to the AMF entity. This may be advantageous because the resources of the base station are released.

In an embodiment, the base station is configured to provide access to the RAN slice only.

Base stations in general may handle a plurality of access requests and provide access to a plurality of RAN slices. Reserving a base station for providing access to the RAN slice only may use the resources of the base station in an advantageous way and therefore further increase the use for the prioritized user equipment.

In an embodiment, the attach request comprises the RAN identifier and a target network slice identifier that identifies a target slice for the user equipment. The base station is configured to grant access to the RAN slice to the user equipment. The base station is configured to forward the attach request with the target network slice identifier towards the AMF entity. The AMF entity is configured to manage forwarding of communication of the user equipment towards the target network slice.

A functional split of access and assignment functionality to the base station and the AMF saves resources of each of the entities.

In an embodiment, the RAN slice comprises a router configured to route communications of the user equipment from the RAN slice towards a communication network, in particular towards a target network slice.

A dedicated router in the RAN slice for routing the communications for the user equipment exclusively towards the communication network increases the benefit for the user equipment, in particular increases a speed and/or a possible transmitted data rate with respect to a common network connection.

In an embodiment, the base station is configured to forward the attach request towards another base station of another communication network identified by another network identifier if the attach request comprises the other network identifier.

The other base station may be a predetermined base station out of a predetermined number of base stations exclusively reserved for handling network content related to the unique RAN slice identifier.

In an embodiment, the base station is configured to receive the attach request from the user equipment or from another base station that has received the attach request.

The user equipment may contact the base station that is assigned to the RAN slice directly or may contact another base station which determines the attach request to be an attach request for the RAN slice and hands the attach request over to the base station that is related to the RAN slice.

In an embodiment, the base station is configured to transmit a RAN slice connectivity parameter indicating communication capabilities of the RAN slice, in particular a frequency band, access communication technology.

The prioritized RAN slice may choose the connectivity parameter to perform a public land mobile network (PLMN) selection. The connectivity parameter may be predetermined to increase the connectivity speed form the terminal to the RAN slice. Furthermore, choosing the transmitted RAN slice connectivity parameter may also improve a connection to the respective core network. The RAN slice does not have to search for an adequate frequency band and respective radio access technology (RAT). For the link connection to the bootstrap server, reserved resources of the RAN slice may be used which may speed up the link connection.

In an embodiment, the base station and/or the AMF entity are configured to provide communication resources, in particular communication bandwidth, signal processing resources and memory for communications of the user equipment over the RAN slice.

Providing resources for communications over the RAN slice allows the entities to provide the prioritized RAN slice and additionally perform a common network operation for another user equipment that is not prioritized.

In an embodiment, the attach request further comprises user priority indication. The user priority indication indicates communication resources assigned to the user equipment. The base station and/or the AMF are configured to assign communication resources of the RAN slice, in particular communication bandwidth, signal processing resources and memory for communications, according to the user priority indication.

User equipment that transmits a valid RAN slice indicator grants access to the RAN slice. Using a user priority indication provides a priority hierarchy for the valid user equipment.

In an embodiment, the attach request further comprises a user equipment identification, in particular an international mobile subscriber identity (IMSI). The AMF and/or the base station are configured to assign communication resources, in particular communication bandwidth, signal processing resources and memory for communications that are assigned to the user equipment identification.

Specific user equipments may be prioritized with respect to granting access to the RAN slice. For example, a mobile phone of a predetermined person, in particular a politician, a body guard, a fireman or the like.

In an embodiment, the base station and/or the AMF are configured to request a transmission of the communication resources from a shared databank that is arranged outside the RAN slice.

Additional transmission resources may be distributed towards the RAN slice if the base station or the AMF requests additional resources. This may be useful if the resources of the RAN slice become short.

In another exemplary embodiment, the invention provides a communication method for providing radio access to a communication network for a user equipment using a radio access network (RAN) slice. The RAN slice is uniquely identified by a RAN slice identifier and comprises a base station for providing access to the RAN slice for the user equipment. The RAN slice comprises an access and mobility management function (AMF) entity which is configured to handle the RAN slice identifier that is identifying the RAN slice and a session management function (SMF) entity which is configured to handle data communications of the user equipment over the RAN slice. The communication method comprises:

receiving an attach request from the user equipment to connect to the RAN slice; and rejecting the access to the RAN slice by the base station if the attach request does not comprise the RAN slice identifier.

In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1 shows a schematic diagram of an arrangement according to an embodiment.

The arrangement comprises a RAN slice 100 of a communication network. The RAN slice 100 is a prioritized RAN slice that reserves resources for prioritized users and their user equipments. The RAN slice 100 is configured to provide prioritized access to the communication network. The RAN slice 100 comprises exclusive resources that are reserved for prioritized user equipments. The resources of the RAN slice 100 comprise a base station 101, in particular a gNodeB of a 5G network, an access and mobility management function (AMF) entity 103 and a session management function (SMF) entity 105. The RAN slice 100 also comprises a user plane function (UPF) entity 104. In another embodiment, the UPF is not part of the RAN slice 100.

The base station 101 comprises a network interface to transmit and receive signals, in particular control signals and/or signals comprising user data. The base station 101 comprises a processor. The processor is configured to process the received signals and to generate signals to be transmitted. The network interface and the processor are in functional communication with each other, so that the processor can process signals received by the network interface and the network interface can transmit signals generated by the processor.

The arrangement comprises a user equipment 102. The user equipment is a mobile phone. In another embodiment the user equipment 102 is another computer system, in particular a notebook, a smart watch, a tablet computer or an IoT device.

The user equipment 102 comprises a network interface to connect to a communication network. The network interface is a radio access network (RAN) interface to connect the user equipment 102 to a RAN.

The user equipment 102 is a prioritized user equipment. The user equipment 102 is allowed to get access to the RAN slice 100 of the communication network to gain prioritized and preferred handling, including in particular gaining a higher data rate, and/or a lower latency and/or a higher quality of service. To connect to the RAN slice 100 the user equipment has a RAN slice identifier stored in a memory of the user equipment 102 or an online memory the user equipment 102 has access to. The user equipment 102 transmits an attach request signal towards the communication network, i.e. to the base station 101 and includes the RAN slice identifier into the attach request.

The base station 101 is configured to check attach requests received by the network interface of the base station 101 for a RAN slice identifier. If the RAN slice identifier determined in the attach request does not correspond to the RAN slice identifier that is assigned to the RAN slice 100, the base station 101 rejects the attach request of the respective user equipment or only provides access to the communication network in a common way, i.e. without providing access to the prioritized RAN slice 100.

If the RAN slice identifier transmitted in the received attach request corresponds to the RAN slice identifier of the prioritized RAN slice 100, the base station 101 grants access to the RAN slice 100 for the user equipment 102 the attach request was transmitted from.

In another embodiment, the attach request signal comprises additionally or alternatively a RAN identifier and a target network identifier. In this embodiment, the base station 101 checks the RAN identifier and the target network identifier and forwards these identifiers towards the AMF entity 103 for granting access to the RAN slice 100 if the RAN identifier and a target network identifier correspond with respective identifiers related to the RAN slice 100. The AMF entity 103 transmits a reject control signal to the base station 101 if the RAN identifier and a target network identifier do not correspond with respective identifiers related to the RAN slice 100.

The RAN slice 100 comprises a router for routing communications from the user equipment 102 towards the communication network, in particular towards a target network slice. In another embodiment, the RAN slice 100 does not comprise this router and manages the respective communication procedures itself.

The base station 101 is configured to check an identification of the user equipment 102, in particular an IMSI, and to provide exclusive resources of the RAN slice 100 to the user equipment 102, if the identification of the user equipment 102 is deposited in a memory related to the RAN slice 100, in particular a database. Therefore, the RAN slice 100 provides exclusive resources for specific user equipment 102 that is reserved only for communications performed towards and from this user equipment 102. In another embodiment, the control of resources related to the identification of the user equipment 102 is performed by the AMF entity 103 additionally or alternatively.

Additionally, the base station 101 and/or the AMF entity 103 has access to shared resources that are not only related to the RAN slice 100, in particular a shared database. The base station 101 or the AMF entity 103, respectively, is configured to request a transmission of communication resources from the shares resources to the RAN slice 100.

Figure 2:
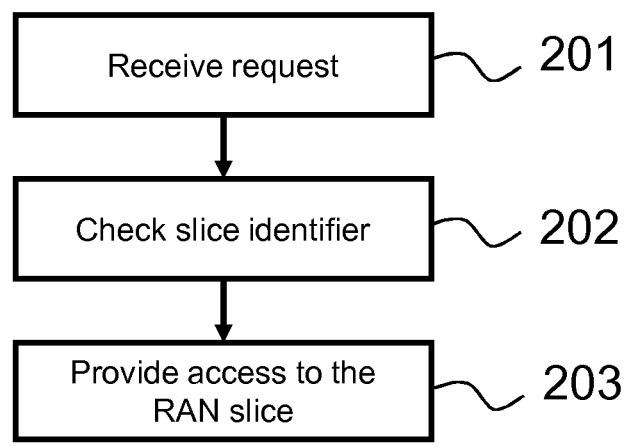
FIG. 2 shows a schematic flowchart diagram of a method according to the embodiment of FIG. 1.

FIG. 2 shows a schematic flowchart diagram 200 of a method according to the embodiment described to FIG. 1. In a step 201, an attach request for connecting to the communication network is received by the base station 101. The request was previously sent by the user equipment 102 by transmitting an attach request signal towards the communication network and therefore towards the base station 101.

In step 202, the processor of the base station 101 checks the attach request for a slice identifier.

If the slice identifier of the transmitted attach request corresponds with the RAN slice identifier of the RAN slice 100, the base station 101 grants the user equipment 102 access to the RAN slice 100 in step 203.

The base station 101 controls the AMF entity 103 to generate a communication session for the user equipment 102. This communication session gains profit of the exclusive resources of the RAN slice 100 and provides a prioritized communication to the user equipment 102, in particular related to a higher data rate, and/or a lower latency and/or a higher quality of service with respect to a common communication session.

If the base station 101 does not determine the transmitted slice identifier to be the RAN slice identifier of the RAN slice 100 in step 202, the base station 101 will not grant access to the RAN slice 100 for the user equipment 102. The base station 101 rejects access to the RAN slice 100. In this case, the base station may hand the attach request over to another base station or may provide access to another RAN slice.

Figure 3:
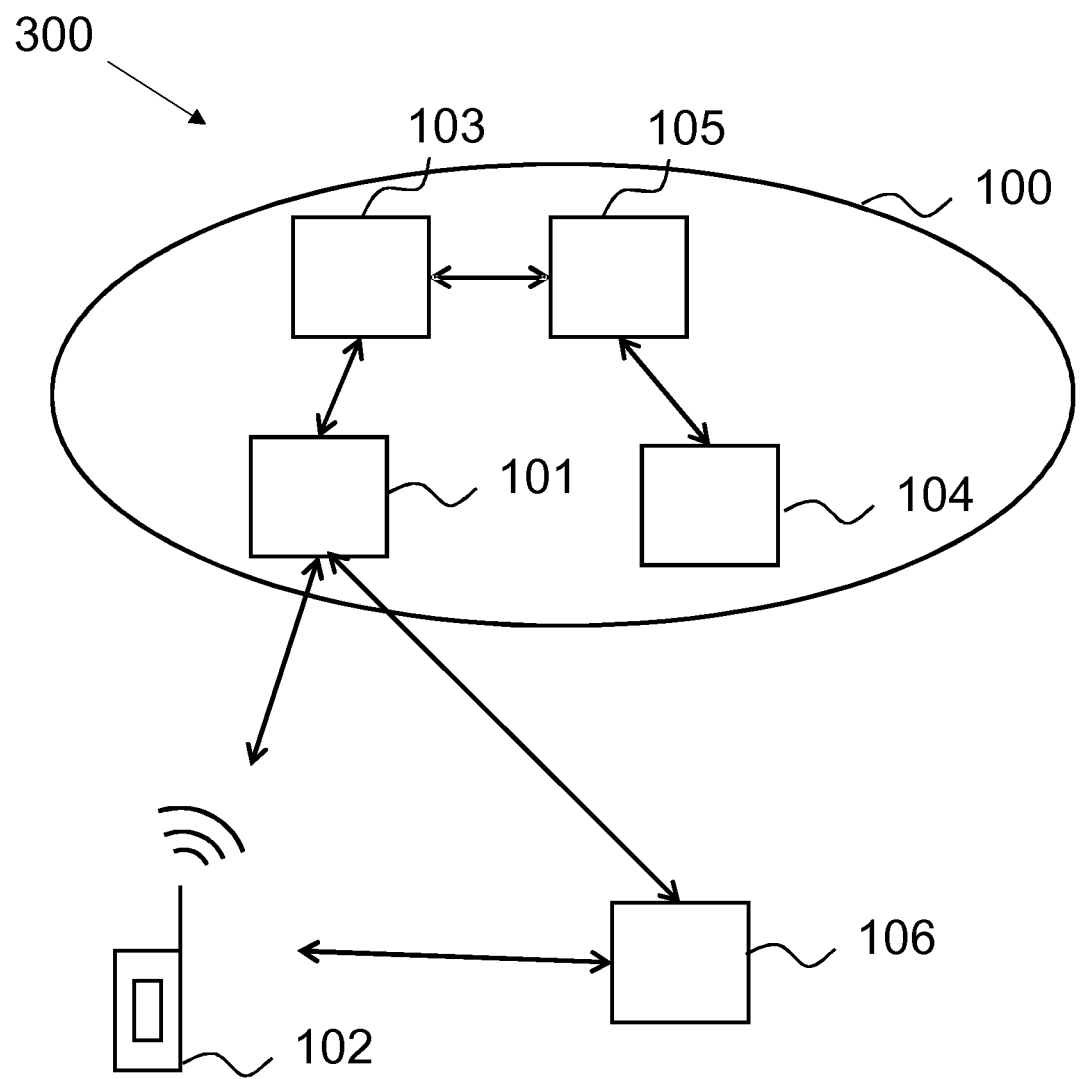
FIG. 3 shows a schematic diagram of an arrangement according to another embodiment of the invention.

FIG. 3 shows a schematic diagram of an arrangement 300 according to another embodiment.

The arrangement 300 comprises the user equipment 102 and another base station 106. The arrangement 300 further comprises the RAN slice 100, including the base station 101, the AMF 103, the UPF 104 and the SMF 105. In another embodiment, the UPF 104 is not part of the RAN slice 100.

The base station 101 of the RAN slice 100 in this embodiment is an exclusive base station only related to the RAN slice 100. In another embodiment, the base station 101 also grants access to other parts of the communication network, in particular to other RAN slices that are different to the prioritized RAN slice 100.

The other base station 106 is not part of the RAN slice 100 and therefore cannot provide access to the RAN slice 100 directly. The other base station 106 is configured check an attach request for a RAN slice identifier. If the other base station 106 detects the RAN slice identifier of the RAN slice 100 in the attach request signal, the other base station 106 forwards the attach request towards the base station 101 of the RAN slice 100.

After handing over the attach request to the base station 101 of the RAN slice 100, the base station 101 of the RAN slice 100 performs the connection of the user equipment 102 to the RAN slice 100 in the above described way. The base station 101 may forward the attach request to the AMF entity 103 that may grant access to the RAN slice 100.

In another embodiment, the attach request signal comprises a RAN identifier and a target network identifier. In this embodiment, the base station 101 checks the RAN identifier and the target network identifier and forwards these identifiers towards the AMF entity 103 for granting access to the RAN slice 100 if the RAN identifier and a target network identifier correspond with respective identifiers related to the RAN slice 100.

The RAN slice 100 comprises a router for routing communications from the user equipment 102 towards the communication network, in particular towards a target network slice. In another embodiment, the RAN slice 100 does not comprise this router and manages the respective communication procedures itself.

The base station 101 is configured to check an identification of the user equipment 102, in particular an IMSI, an to provide exclusive resources of the RAN slice 100 to the user equipment 102, if the identification of the user equipment 102 is deposited in a memory related to the RAN slice 100, in particular a database. Therefore, the RAN slice 100 provides exclusive resources for specific user equipment 102 that is reserved only for communications performed towards and from this user equipment 102. In another embodiment, the control of resources related to the identification of the user equipment 102 is performed by the AMF entity 103 additionally or alternatively.

Additionally, the base station 101 and/or the AMF entity 103 has access to shared resources that are not only related to the RAN slice 100, in particular a shared database. The base station 101 or the AMF entity 103, respectively, are configured to request a transmission of communication resources from the shares resources to the RAN slice 100.

Figure 4:
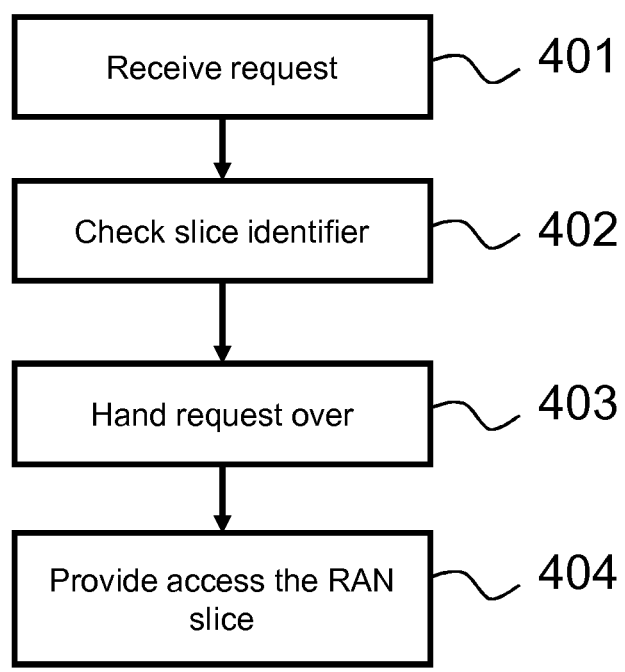
FIG. 4 shows a schematic flowchart diagram of a method according to the embodiment of FIG. 3.

FIG. 4 shows a schematic flowchart diagram 400 of a method according to the embodiment described to FIG. 3.

In a step 401, an attach request for connecting to the communication network is received by the other base station 106. The other base station 106 is not configured to grant access to the RAN slice 100.

The other base station 106 checks the slice identifier of the attach request in step 402.

If the other base station 106 determines that the transmitted slice identifier corresponds with the RAN slice identifier of the RAN slice 100, the other base station 101 that receives the attach request signal in step 401 is not configured to create a prioritized session for the user equipment 102. Therefore, the other base station 106 that received the control signal in step 401 hands the attach request over to the base station 101 in step 403 after determining that the user equipment 102 sent an attach request comprising a slice identifier corresponding with the RAN slice identifier of the RAN slice 100.

In step 404, the base station 101 provides prioritized access to the RAN slice 100 of the communication network for the user equipment 102 in the above described way.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

100 RAN slice
101 base station
102 user equipment
103 AMF entity
104 UPF entity
105 SMF entity
106 other base station
200, 400 flowchart diagram
300 arrangement
201 to 203 step
401 to 404 step

The invention claimed is:

1. A radio access network (RAN) slice for providing radio access to a communication network for a user equipment, the RAN slice comprising:
 a base station for providing access to the RAN slice for the user equipment;
 an access and mobility management function (AMF) entity configured to handle a RAN slice identifier identifying the RAN slice, wherein the RAN slice is uniquely identified by the RAN slice identifier and comprises exclusive resources that are reserved for prioritized user equipment; and
 a session management function (SMF) entity configured to handle data communications of the user equipment over the RAN slice;
 wherein the base station is configured to:
  receive an attach request originating from the user equipment to connect to the RAN slice, wherein the attach request comprises a user priority indication, the user priority indication indicating communication resources assigned to the user equipment;
  based on the RAN slice identifier being comprised in the attach request, grant access to the RAN slice to the user equipment;
  check an identification of the user equipment; and
  based on the identification of the user equipment being stored in a memory related to the RAN slice, provide exclusive resources of the RAN slice to the user equipment;
 wherein the base station and/or the AMF are further configured to assign communication resources of the RAN slice according to the user priority indication, wherein the communication resources include communication bandwidth, signal processing resources and memory for communications.

2. The RAN slice according to claim 1, wherein the base station is further configured to:
 receive a second attach request which comprises a transmitted slice identifier;
 compare the transmitted slice identifier with the RAN slice identifier in order to determine whether the transmitted slice identifier corresponds to the RAN slice identifier; and
 based on the transmitted slice identifier being different from the RAN slice identifier, reject access to the RAN slice.

3. The RAN slice according to claim 1, wherein the base station is further configured to:
 receive a second attach request which comprises a transmitted slice identifier; and
 forward the transmitted slice identifier or the attach request towards the AMF entity;
 wherein the AMF entity is further configured to:
  compare the transmitted slice identifier with the RAN slice identifier in order to determine whether the transmitted slice identifier corresponds to the RAN slice identifier; and
  based on the transmitted slice identifier being different from the RAN slice identifier, transmit a reject signal towards the base station; and
 wherein the base station is further configured to reject access to the RAN slice for the user equipment in response to the reject signal.

4. The RAN slice according to claim 1, wherein the base station is configured to provide access to the RAN slice only.

5. The RAN slice according to claim 1, wherein the attach request comprises the RAN slice identifier and a target network slice identifier that identifies a target slice for the user equipment;
 wherein the base station is further configured to:
  grant access to the RAN slice to the user equipment; and
  forward the attach request with the target network slice identifier towards the AMF entity; and
 wherein the AMF entity is further configured to manage forwarding of communication of the user equipment towards the target network slice.

6. The RAN slice according to claim 1, further comprising:
 a router configured to route communications of the user equipment from the RAN slice towards a target network slice.

7. The RAN slice according to claim 1, wherein the base station is further configured to forward the attach request towards another base station of another communication network identified by another network identifier in response to the attach request comprising the other network identifier.

8. The RAN slice according to claim 1, wherein the base station is further configured to receive the attach request from the user equipment or from another base station that has received the attach request.

9. The RAN slice according to claim 1, wherein the base station is further configured to transmit a RAN slice connectivity parameter indicating a frequency band and an access communication technology of the RAN slice.

10. The RAN slice according to claim 1, wherein the base station and/or the AMF entity are further configured to provide communication bandwidth, signal processing resources and memory for communications of the user equipment over the RAN slice.

11. The RAN slice according to claim 1, wherein the attach request further comprises an international mobile subscriber identity (IMSI) of the user equipment; and
 wherein the AMF and/or the base station are further configured to assign communication resources that are assigned to the IMSI of the user equipment, wherein the communication resources include communication bandwidth, signal processing resources and memory for communications.

12. The RAN slice according to claim 1, wherein the base station and/or the AMF are further configured to request transmission of the communication resources from a shared databank arranged outside the RAN slice.

13. The RAN slice according to claim 1, wherein providing exclusive resources of the RAN slice to the user equipment comprises providing a prioritized communication session for the user equipment having a higher data rate, a lower latency, and/or higher quality of service relative to a common communication session for another user equipment which is not prioritized.

14. A communication method for providing radio access to a communication network for a user equipment using a Radio Access Network (RAN) slice, wherein the communication method comprises:
- receiving, by a base station for providing access to the RAN slice for the user equipment, an attach request from the user equipment to connect to the RAN slice, wherein the RAN slice is uniquely identified by a RAN slice identifier and comprises exclusive resources that are reserved for prioritized user equipment, and wherein the attach request comprises a user priority indication, the user priority indication indicating communication resources assigned to the user equipment;
- based on the RAN slice identifier being comprised in the attach request, granting, by the base station, access to the RAN slice to the user equipment;
- checking, by the base station, an identification of the user equipment; and
- based on the identification of the user equipment being stored in a memory related to the RAN slice, providing, by the base station, exclusive resources of the RAN slice to the user equipment;
- wherein the method further comprises: assigning, by the base station and/or an access and mobility management function (AMF) entity of the RAN slice, communication resources of the RAN slice according to the user priority indication, wherein the communication resources include communication bandwidth, signal processing resources and memory for communications.

* * * * *